(12) United States Patent
Schulte

(10) Patent No.: US 9,891,806 B2
(45) Date of Patent: Feb. 13, 2018

(54) ASSIGNMENT ROTATOR

(71) Applicant: dSPACE digital signal processing and control engineering GmbH, Paderborn (DE)

(72) Inventor: Sebastian Schulte, Meppen (DE)

(73) Assignee: dSPACE digital signal processing and control engineering GmbH, Paderborn (DE)

( * ) Notice: Subject to any disclaimer, the term of this patent is extended or adjusted under 35 U.S.C. 154(b) by 288 days.

(21) Appl. No.: 14/702,805

(22) Filed: May 4, 2015

(65) Prior Publication Data

US 2015/0324105 A1 Nov. 12, 2015

(30) Foreign Application Priority Data

May 8, 2014 (EP) .................................... 14167501

(51) Int. Cl.
*G06F 3/0484* (2013.01)
*G06F 17/30* (2006.01)
(Continued)

(52) U.S. Cl.
CPC ..... *G06F 3/04847* (2013.01); *G05B 19/0426* (2013.01); *G06F 3/0482* (2013.01);
(Continued)

(58) Field of Classification Search
CPC .................................................. G06F 3/0482
(Continued)

(56) References Cited

U.S. PATENT DOCUMENTS 6,147,674 A * 11/2000 Rosenberg ............. B25J 9/1689
345/157
6,188,403 B1 * 2/2001 Sacerdoti .......... G06F 17/30554
345/440

(Continued)

FOREIGN PATENT DOCUMENTS

CN 101520657 A 9/2009
CN 103149849 A 6/2013
(Continued)

OTHER PUBLICATIONS

Thomas, Annemarie, "dSPACE DS1103 Control Workstation Tutorial and DC Motor Speed Control Tutorial", available on May 14, 2009, available at <http://ee.bradley.edu/projects/proj2009/dscntrl/>, 61 pages.*

(Continued)

*Primary Examiner* — Reza Nabi
*Assistant Examiner* — Daniel Rodriguez
(74) *Attorney, Agent, or Firm* — Muncy, Geissler, Olds & Lowe, P.C.

(57) ABSTRACT

A method and data processing system for linking a plurality of data structures of a data processing system with a plurality of elements of a man-machine interface (MMI) are provided. The method includes the steps: provision of an MMI with a plurality of elements, arranging a plurality of data structures in a list, selection of an element of the MMI by a user, automatic linking of a first data structure from the list with the selected element of the MMI, and setting the beginning of the list to the data structure that follows the previously linked data structure in the list. The steps of selection of an element of the MMI by a user, automatic linking of a first data structure from the list with the selected element of the MMI, and setting the beginning of the list to the data structure are carried out repeatedly.

15 Claims, 3 Drawing Sheets

(51) Int. Cl.
*G06F 3/0482* (2013.01)
*G05B 19/042* (2006.01)

(52) U.S. Cl.
CPC .... *G06F 3/04842* (2013.01); *G06F 17/30312* (2013.01); *G05B 2219/23067* (2013.01)

(58) Field of Classification Search
USPC .................................................. 715/771
See application file for complete search history.

(56) References Cited

U.S. PATENT DOCUMENTS

| | | | | |
|---|---|---|---|---|
| 6,587,108 | B1* | 7/2003 | Guerlain | G05B 23/0267 345/440 |
| 6,664,978 | B1* | 12/2003 | Kekic | H04L 41/0213 709/203 |
| 7,921,366 | B2* | 4/2011 | Komura | G06F 3/0238 715/738 |
| 8,000,814 | B2 | 8/2011 | Havekost et al. | |
| 8,387,019 | B1* | 2/2013 | Ogami | G06F 9/44505 717/100 |
| 8,489,872 | B1* | 7/2013 | Kapoor | G06F 17/30386 709/227 |
| 8,533,670 | B2 | 9/2013 | Dye et al. | |
| 9,043,716 | B2* | 5/2015 | Jundt | G05B 19/0426 715/736 |
| 2003/0028446 | A1* | 2/2003 | Akers | G06Q 10/087 705/26.81 |
| 2004/0046775 | A1* | 3/2004 | Dong | G06F 17/3071 715/700 |
| 2004/0255269 | A1* | 12/2004 | Santori | G06F 8/38 717/109 |
| 2005/0060298 | A1* | 3/2005 | Agapi | G06F 3/0482 |
| 2005/0268217 | A1* | 12/2005 | Garrison | G06F 17/243 715/234 |
| 2007/0118807 | A1* | 5/2007 | Komura | G06F 3/0238 715/764 |
| 2007/0179976 | A1* | 8/2007 | Arvin | G06F 17/50 |
| 2008/0244449 | A1* | 10/2008 | Morrison | G05B 19/409 715/810 |
| 2009/0217200 | A1* | 8/2009 | Hammack | G05B 19/0426 715/810 |
| 2010/0235771 | A1* | 9/2010 | Gregg, III | G06T 11/206 715/769 |
| 2011/0225525 | A1* | 9/2011 | Chasman | G06F 3/0486 715/763 |
| 2011/0302551 | A1* | 12/2011 | Hummel, Jr. | G06Q 10/06 717/105 |
| 2012/0159336 | A1 | 6/2012 | Norwood | |
| 2012/0167012 | A1* | 6/2012 | Sander | G06F 17/30 715/841 |
| 2013/0006395 | A1 | 1/2013 | Plache et al. | |
| 2014/0129969 | A1* | 5/2014 | Chasman | G06F 3/0486 715/769 |
| 2014/0245157 | A1* | 8/2014 | Biniak | G06Q 10/1053 715/733 |
| 2014/0245256 | A1* | 8/2014 | Petzoldt | G06F 8/34 717/109 |
| 2015/0082224 | A1* | 3/2015 | Hathaway | G06F 9/44 715/771 |
| 2015/0106758 | A1* | 4/2015 | Boys | G06F 3/0484 715/771 |
| 2016/0054981 | A1* | 2/2016 | Cao | G06F 8/34 717/109 |
| 2016/0313982 | A1* | 10/2016 | Jensen | G06F 8/34 |

FOREIGN PATENT DOCUMENTS

| | | |
|---|---|---|
| EP | 1 038270 | 1/1998 |
| EP | 1 359 498 A2 | 11/2003 |
| EP | 2 541 354 A2 | 1/2013 |
| JP | H 09-269893 A | 10/1997 |
| JP | 2003-058442 A | 2/2003 |
| JP | 2003-531414 A | 10/2003 |
| JP | 2007-536631 A | 12/2007 |
| JP | 2008-129700 A | 6/2008 |
| JP | 2009-238219 A | 10/2009 |
| JP | 2012-159943 A | 8/2012 |
| JP | 2012-168964 A | 9/2012 |
| JP | 2014-006567 A | 1/2014 |

OTHER PUBLICATIONS

European Search Report for European Application No. 14167501.7 dated Jan. 5, 2015 with English translation.
"Getting Started with LabVIEW Touch Panel Module for Windows CE," http://www.ni.com/pdf/manual_see/371940a.pdf, pp. 1-20 (Jan. 1, 2006).
Japanese Office Action for Japanese Office Action No. 2015-095691 dated Nov. 14, 2016 with English translation.
dSPACE, "ControlDesk Next Generation Basic Practices Guide for ControlDesk 5.0," pp. 1-930 (May 2013).
China Office Action dated Jul. 19, 2017 with English Translation.
European Office Action for European Application No. 14167501.7 dated Dec. 6, 2017 with English translation.

* cited by examiner

ASSIGNMENT ROTATOR

This nonprovisional application claims priority under 35 U.S.C. §119(a) to European Patent Application No. EP 14167501.7, which was filed on May 8, 2014, and which is herein incorporated by reference.

BACKGROUND OF THE INVENTION

Field of the Invention

The present invention relates to a method for linking a plurality of data structures of a data processing system with a plurality of elements of a man-machine interface (MMI), wherein the data structures represent components of a real or virtual open-loop or closed-loop control system or stand in relationship to components of a real or virtual open-loop or closed-loop control system. In addition, the invention relates to a data processing device having a man-machine interface (MMI) with a plurality of elements and a plurality of data structures, wherein the data structures represent components of a real or virtual open-loop or closed-loop control system or stand in relationship to components of a real or virtual open-loop or closed-loop control system, for carrying out the abovementioned method. The present invention also relates to a computer program product with computer-implemented instructions that executes the steps of the above method after loading and execution in a suitable data processing device, as well as a digital storage medium with control signals that are read out electronically and that can interact with a programmable data processing device in such a manner that the above method is carried out on the data processing device.

Description of the Background Art

In the field of model-based development of control systems, for example, it can be necessary for a developer to be able to visualize or also manipulate, at the runtime of the model, quantities present in the models described. To this end, virtual display elements and/or operator controls can be used, e.g., virtual analog or digital value displays, virtual warning lamps, virtual switches, or input fields for values. These display elements and operator controls are also referred to as instruments.

One example of a known application in the area of modeling of an open or closed control loop is the applicant's product, ControlDesk. In this product, variables are provided from an executable model that mathematically reproduces a technical or physical process or represents the control algorithm for a technical process. The variables can thus represent, for example, technical or physical quantities such as, e.g., voltages, temperatures, or even technically determined parameters such as error messages or timeout periods. Another known application in this area is the applicant's product, ConfigurationDesk. In this product, connections are produced between elements of an MMI in the form of control unit ports and data structures in the form of model interfaces.

Typically, linking of elements of the MMI and of the data structures is accomplished in a graphical MMI using "drag & drop," which is to say that a data structure is selected, for example using a mouse, and is dragged onto an element of the MMI so that the element of the MMI and the data structure can be linked. Consequently, the linking of variables and instruments can be very time-consuming. This can still be feasible for linking a single data structure with a single element of the MMI, but not when a plurality of connections need to be made. In the area of model-based development of open-loop and closed-loop control systems, in particular, it can be necessary to link a large number of data structures, for example variables, with a large number of elements, for example virtual elements, in an MMI in order to be able to display or manipulate these variables. This can involve a tremendous expenditure of time.

One possibility for reducing this expenditure of time is in creating the links in an automated way, e.g., through identical identifiers. However, this is not possible for all data structures or elements of the MMI. Alternatives, such as creating an instrument for all variables, offer very little flexibility.

In the case of model interfaces or control unit ports with a complex structure, e.g., hierarchical structures such as oftentimes occur in busses, for instance in the CAN bus in the automotive industry, the assignment can be made even more difficult by different hierarchy levels. Consequently, under certain circumstances automatic assignment may not be possible because of inconsistent hierarchy levels on the two sides.

SUMMARY OF THE INVENTION

It is therefore an object of the present invention to provide a method, a data processing device, a computer program product, and a digital storage medium with control signals that are read out electronically that allow easy linking of data structures and elements of an MMI in an efficient manner.

According to an embodiment of the invention, a method for linking a plurality of data structures of a data processing system with a plurality of elements of a man-machine interface (MMI) is thus provided, wherein the data structures represent components of a real or virtual open-loop control system, closed-loop control system, or mechatronic system, or connections to components of a real or virtual open-loop control system, closed-loop control system, or mechatronic system, including the following steps: provision of an MMI with a plurality of elements, arranging the plurality of data structures in a list, selection of an element of the MMI by a user, automatic linking of a first data structure from the list with the selected element of the MMI, and setting the beginning of the list to the data structure that follows the previously linked data structure in the list, wherein the steps of selection of an element of the MMI by a user, automatic linking of a first data structure from the list with the selected element of the MMI, and setting the beginning of the list to the data structure that follows the previously linked data structure in the list are carried out repeatedly in this order.

According to an embodiment of the invention, a method for linking a plurality of data structures of a data processing system with a plurality of elements of a man-machine interface (MMI) is provided, wherein the data structures represent components of a real or virtual open-loop control system, closed-loop control system, or mechatronic system, or connections to components of a real or virtual open-loop control system, closed-loop control system, or mechatronic system, comprising the following steps: provision of an MMI with a plurality of elements, arranging the plurality of elements in a list, provision of an output element in the MMI to represent at least a subset of the plurality of data structures, selection of a data structure in the output element by a user, automatic linking of a first element from the list with the selected data structure, and setting the beginning of the list to the element of the MMI that follows the previously linked element in the list, wherein the steps of selection of a data structure in the output element by a user, automatic linking of a first element from the list with the selected data structure, and setting the beginning of the list to the element of the MMI that follows the previously linked element in the list are carried out repeatedly in this order.

According to an embodiment of the invention, a data processing device having a man-machine interface (MMI) with a plurality of elements and a plurality of data structures is also provided, wherein the data structures represent components of a real or virtual open-loop control system, closed-loop control system, or mechatronic system, or connections to components of a real or virtual open-loop control system, closed-loop control system, or mechatronic system, for carrying out the method.

According to an embodiment of the invention, a computer program product with computer-implemented instructions that executes the steps of the above method after loading and execution in a suitable data processing device is also provided.

Also provided is a digital storage medium with control signals that are read out electronically and that can interact with a programmable data processing device in such a manner that the above method is executed on the data processing device.

An idea of the present invention is thus to facilitate the linking of data structures and elements of the MMI in that the data structures are arranged in the list, and can automatically be assigned from the list to a selected element of the MMI and be linked therewith. In this way, the linking of data structures and elements of the MMI is accelerated as compared to the previous method, since it is not necessary to first select a variable and then an element of the MMI for each linking, but instead all data structures from the list that are to be linked can be linked to an element of the MMI from the list in accordance with their order in the list with a single action in each case, e.g., a mouse click. This method is flexible in comparison with automated assignment of data structures and elements of the MMI, and also in comparison with a method customary in the prior art using the principles of "drag & drop."

The MMI can have, for example, a screen to output information and an input device that can be in the manner of a pointing device, for example a computer mouse or touchpad, in order to enter information via the screen. In principle, input and output devices of any type can be used here, for example acoustic or visual output devices, as well as input devices for visual input, voice control, or gesture control.

The list can be implemented in different ways, wherein access to the first element in each case is relevant. For example, the list can be implemented as a queue. The list can also be implemented in such a way that individual list elements are stored in their order in the list. Alternatively, the list's elements can be contained in the list independently of their order, wherein the order of the list elements arises from connections of the individual list elements or from list pointers.

The data structures represent parts of technical systems, for example variables, parameters, interfaces, ports, models, intelligent sensors, or communication partners.

The elements of the MMI can be implemented as virtual configuration elements, e.g., graphical representations of ports or interfaces; as virtual operator controls, for example virtual switches, slide controls, or rotary controls; and as virtual display elements, for example virtual signal lamps, value displays, or plotters. Accordingly, the elements of the MMI can have an output and/or input function for the data structure.

The linking of the first list element with the selected element of the MMI can be accomplished here without logically or physically removing the data structure from the list. Consequently, even multiple assignment of a data structure to different elements of the MMI can take place. For example, data structures that are already linked can be linked again.

Sources of data structures and elements of the MMI can be different, based on the above-described different implementation possibilities for the data structures and the elements of the MMI. For example, a separate modeling and instrumentation program, or a separate hardware configuration and instrumentation program, can be used as sources.

The data processing device can comprise a single data processing system, for example a computer, or can be a distributed data processing device with a plurality of data processing systems arranged in a distributed manner, for example, and connected to one another through a network connection, for example an Internet connection.

The MMI can comprise a browser, in particular a Web browser, in which the method can be performed graphically. The browser can be used in a simple manner to represent elements of the MMI. By means of the easy connection to a network, information from individual data processing systems can easily be processed jointly.

The selection of an element of the MMI by a user can be accomplished through an operation by the user in the MMI. The operation can in principle take place in various ways. For instance, the operation can be an input through the MMI. Alternatively, a selection that is not changed over a predetermined period can also be interpreted as an operation for the linking of the first data structure from the list with the element of the MMI.

The aforementioned principles for the method of linking data structures and elements of the MMI relate accordingly to the design of the method with the arrangement of the data structures in the list. Alternatively, it is also possible to arrange the elements of the MMI in a list. The statements above, and those below, relating to the method with the arrangement of the data structures in the list apply analogously for the method with the arrangement of the elements of the MMI in the list.

In an embodiment of the invention, the method includes the additional step of terminating the method when the end of the list of the data structures is reached, or as soon as a data structure is assigned to each element of the MMI. A linking of all available data structures with elements of the MMI, or a linking of all elements of the MMI with data structures, can thus take place.

In an embodiment of the invention, the step of setting the beginning of the list to the data structure that follows the previously linked data structure in the list can include a removal of the previously linked data structure from the list. Accordingly, the data structure can be removed in order to allocate few resources, or to release allocated resources again. Alternatively, a logical deletion can take place in that only links of the list are changed, without changing the elements of the list themselves. In this design, the display of a data structure that has been logically deleted can be suppressed, for example. Alternatively or in addition, a logically deleted data structure can be marked accordingly when shown in a display of the MMI. For example, already linked data structures can be color-marked when shown in a visual display of the list, for example they can be grayed out or similarly marked.

In an embodiment of the invention, the method includes the additional step of navigation in the list of data structures. In this way, provision can be made to skip over data structures in the list in order to link them with an element of the MMI, for example. This can be accomplished in that the beginning of the list can be set to a subsequent list element, for example.

In an embodiment of the invention, the MMI can include an output element for displaying at least one data structure, and the method can include the additional step of displaying in the output element at least the data structure to which the list beginning is set. As a result, it is possible to ascertain directly through the MMI which data structure in the list is the next one to be linked. By means of the display of at least the data structure to which the list beginning is set, a user can identify the data structure before linking, and accordingly can carry out the linking easily and efficiently. If multiple data structures are displayed at the beginning of the list, it is possible to achieve a further improved overview for a user.

In an embodiment of the invention, the MMI can have a graphical selector, in particular a pointer, that can be moved between the elements of the MMI, and selection of an element of the MMI by a user comprises moving the graphical selector to the element of the MMI to be selected and confirming the selection. With the graphical selector, a selection of the element of the MMI can take place visually in that the graphical selector is used to select the element of the MMI. The graphical selector can be implemented in the manner of a pointer, for example a mouse pointer. Alternatively, the graphical selector can also be a marking of a currently selected element of the MMI, for example in the manner of a movable frame. Another provision can be made that the user, after selecting the element of the MMI, carries out an action to confirm the selection and link the selected element of the MMI to the first data structure of the list. The action can be an input through the MMI, for example. Alternatively, a selection that is not changed over a predetermined period of time, for example when the mouse pointer rests on the element of the MMI for the predetermined period, can also be interpreted as an action for confirming the linking of the first data structure in the list with the selected element of the MMI.

In an embodiment of the invention, the MMI includes an output unit assigned to the graphical selector for displaying at least one data structure, wherein the output unit can be moved with the graphical selector, and the method includes the additional step of displaying in the output unit at least the data structure to which the list beginning is set. With the display in the output unit, it is possible to show a user at least the data structure to which the list beginning is set directly in the context with the selection of the element of the MMI to be linked, so the user sees directly which data structure will be linked in the event of selection. Also, the output unit can be implemented in the manner of a tooltip.

In an embodiment of the invention, the step of arranging the plurality of data structures in a list can include sorting of data structures in the list. Sorting of the list makes it possible for elements of the list having greater importance and/or that are used frequently to be positioned at the beginning of the list so that they can be accessed easily. In this way, the linking of data structures with elements of the MMI can be concluded when all data structures having a high priority are assigned to elements of the MMI, for example, without necessitating the time-consuming process of linking all data structures of the list that are located in the list ahead of data structures with a high priority. The order of the data structures in the list can be manually determined by the user, for example. In this way, the user can change the sort order of the individual elements in the list by moving/prioritizing. It is possible in this design to sort the list only partially, and leave a portion unsorted. For example, a predetermined number of data structures, for instance the ten or one hundred most important data structures, can be arranged at the beginning of the list with the rest of the list remaining unorganized.

In an embodiment of the invention, the step of sorting of data structures in the list can include the determination of at least one sort criterion for sorting the data structures in the list, and includes the automatic sorting of the data structures in the list according to the at least one sort criterion. In this way, the sorting can take place automatically, for example, directly by the data processing device. Alternatively, a different arithmetic logic unit can also be used for automatic sorting of the list. Examples of a sort criterion in the case of data structures that are variables can include alphanumeric strings relating to the name or to a description of the variables, a variable type (int8, int16, float32, bool, etc.), an update rate (sample time) of the variables, or a functional block to which the applicable data structure is assigned. For modeling of an open or closed control loop, a functional block can be a model component, for example. For interfaces, a sort criterion can be, for example, the name, the description, or a hierarchy of the interfaces within components. The hierarchy can relate to a model or a hardware unit of an open or closed control loop in which the interfaces are present, for example. The sorting of data structures in the list can also take place using a plurality of sort criteria in that the sort criteria are employed one after the other.

In an embodiment of the invention, the method can include the additional step of selecting the plurality of data structures of the data processing system from among a universe of available data structures of the data processing system. The selection of data structures makes it possible to select, from a universe(s) of available data structures, the data structures that are of particular importance and/or are used frequently. The selection of data structures can be carried out manually by the user, for example. For instance, a predetermined number of data structures, such as the twenty or two hundred most important data structures, can be selected from the universe(s) of data structures and imported into the list. In this case, the rest of the data structures remain disregarded. This facilitates use of the list, since it remains manageable due to the prior selection of data structures.

In an embodiment of the invention, the step of selecting the plurality of data structures of the data processing system from among a universe of available data structures can include the determination of at least one filter criterion for selecting the plurality of data structures and the automatic selection of the plurality of data structures of the data processing system from the universe(s) of available data structures according to the at least one filter criterion. In this way, the selection of data structures can take place automatically, for example, directly by the data processing device. Alternatively, a different arithmetic logic unit can also be used for automatic selection of the data structures. Examples of a filter criterion in the case of data structures that are variables include alphanumeric strings relating to the name or to a description of the variables, a variable type (int8, int16, float32, bool, etc.), an update rate (sample time) of the variables, or a functional block to which the applicable data structure is assigned. For modeling of an open or closed control loop, a functional block can be a model component, for example. For interfaces, a filter criterion can be, for example, the name, the description, or a hierarchy of the interfaces within components. The hierarchy can concern a model or a hardware unit of an open or closed control loop in which the interfaces are present, for example. The selection of the data structures from the universe(s) of data structures can also take place using a plurality of filter criteria in that the filter criteria can be employed one after the other.

In an embodiment of the invention, the method can include the additional step of outputting a content of a data structure in the linked element of the MMI. The output takes place as a function of the element type, for example as a display of a variable at the runtime of the model of the open or closed control loop to which the data structure belongs.

In an embodiment of the invention, the MMI can have a touch-screen for displaying and selecting the elements of the MMI. In the case of a touch-screen, operation normally takes place using the surface of a screen. Accordingly, certain operator actions that are known from operation of electronic systems by means of a mouse and keyboard, for example, cannot be transferred, or transfer only poorly, to operation using a touch-screen. For example, the linking of elements of the MMI with the data structures in software for modeling technical systems by "drag & drop," as is known in the conventional art, is associated with problems in touch-screen operation. While it is true in principle that elements can be "grabbed" with a finger and moved in this environment, as is customary with the mouse in "drag & drop," nevertheless erroneous assignments resulting from unintentional loss of contact with the surface of the touch-screen are more frequent than with comparable operation methods using the mouse or comparable pointer. Moreover, a screen area of the application with the grabbed data structure can only be moved with difficulty, something which is frequently necessary in large technical systems with many elements. The possibility of operator errors is reduced by the means that the linking of data structures and elements of the MMI takes place without selection of the data structures, since the data structures are already provided automatically from the list, with the first element from the list already being preselected. Consequently, linking of the applicable first element of the list with an element of the MMI represented on the screen is easily possible using touch-screen operation, even when the screen area must first be moved for this purpose. A possible selection of data structures, or sorting of the data structures in the lists, can be carried out separately, wherein the same principles for operation are applicable in order to be able to carry out these steps easily by touch-screen operation as well.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
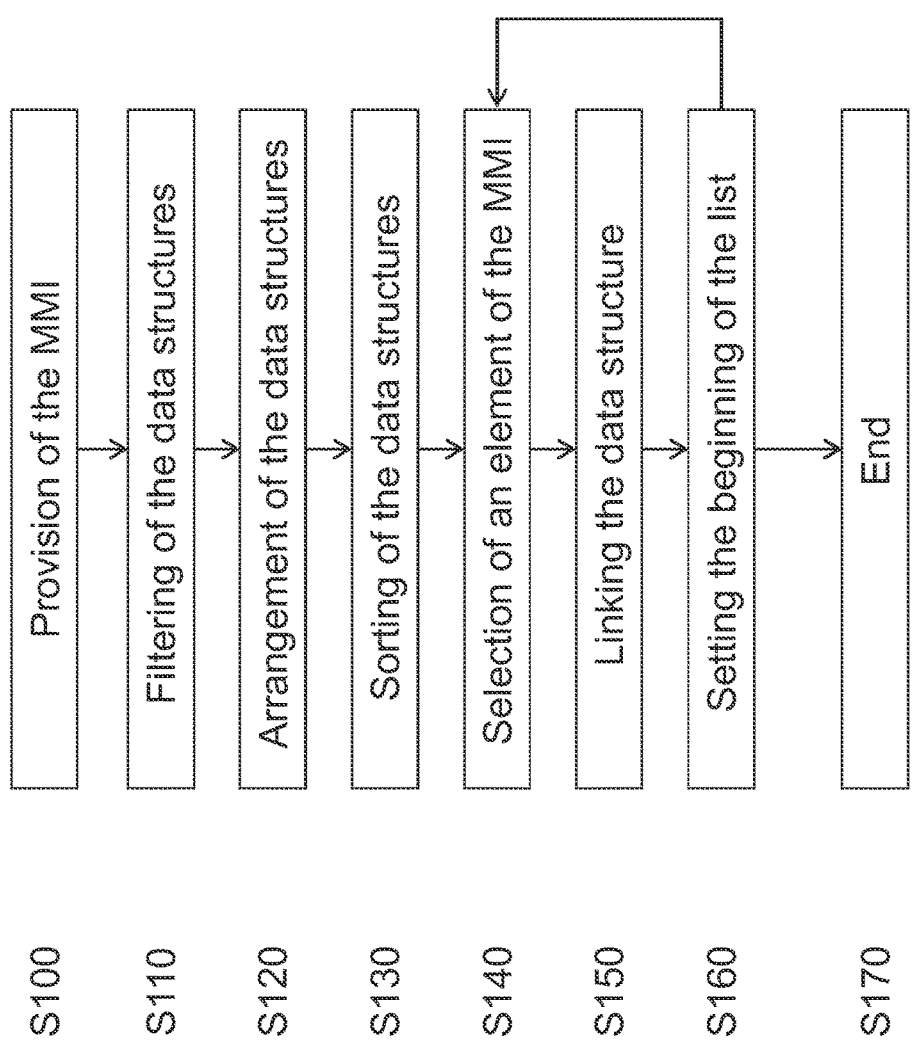
FIG. 1 is a flowchart of a performance of a method for linking a plurality of data structures of a data processing system with a plurality of elements of a man-machine interface (MMI) according to an embodiment of the invention.

FIG. 1 shows a flowchart of a method according to the invention for linking a plurality of data structures of a data processing system with a plurality of elements of a man-machine interface (MMI) according to a first embodiment.

In this exemplary embodiment, the data processing system is a single computer that is implemented with a touch-screen as both the display device and the input device. Operation of the touch-screen takes place using the surface of a screen.

Figure 2:
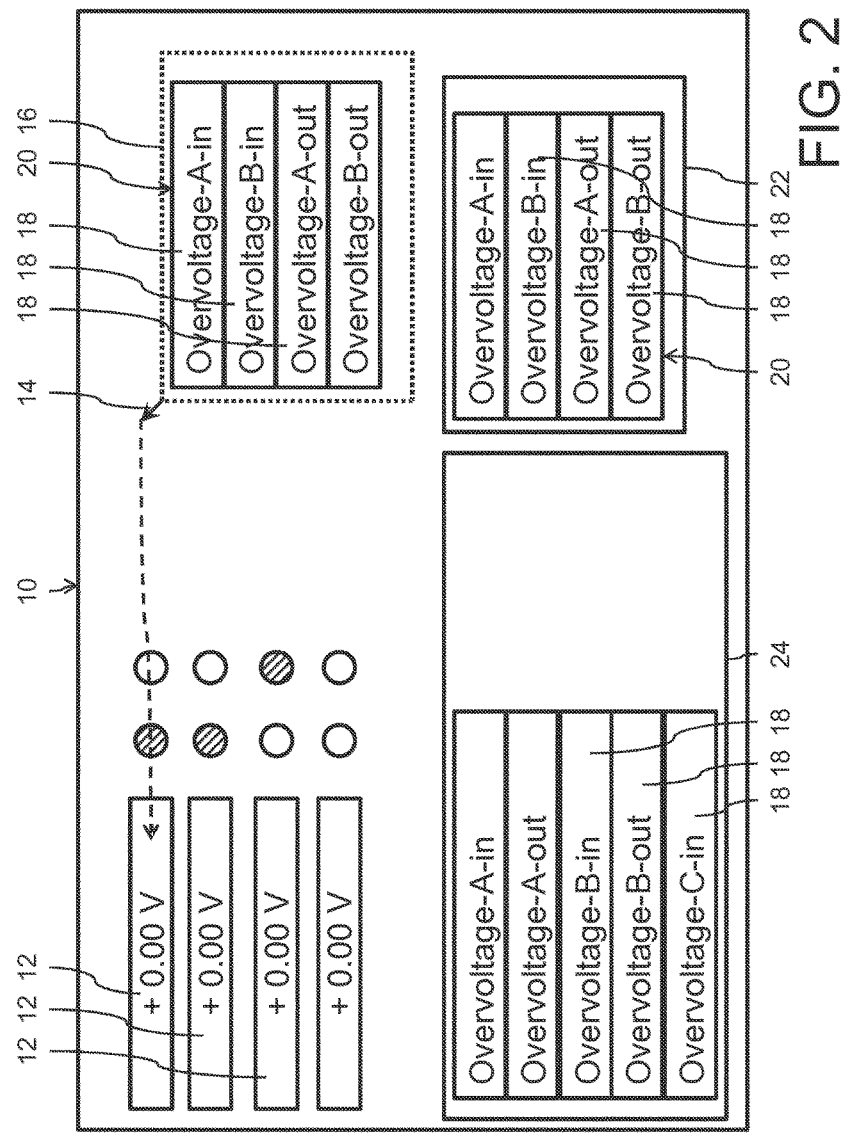
FIG. 2 is a schematic view of a graphical output of the MMI.

Shown on the touch-screen as part of the MMI is a browser window 10, in which the method is performed graphically, as shown in FIG. 2. Displayed in the browser 10 are a plurality of elements 12 of the MMI. Shown in the browser window 10 as the graphical selector 14 is a pointer that is movable in the browser 10. Shown in an output unit 16, which in the present exemplary embodiment is implemented as a tooltip and is assigned to, and is movable with, the graphical selector 14, are data structures 18, which are part of a list 20, as will be explained below. Also shown in the browser window 10 is an output element 22, in which data structures 18 of the list 20 are likewise shown.

The data structures 18 are components of a real or virtual open-loop control system, closed-loop control system, or mechatronic system, or are connections to components of a real or virtual open-loop control system, closed-loop control system, or mechatronic system. They represent parts of technical systems, for example variables, parameters, interfaces, ports, models, intelligent sensors, or communications partners.

The elements 12 of the MMI are implemented here as virtual configuration elements, e.g., graphical representations of ports or interfaces, as virtual operator controls, for example virtual switches, slide controls, or rotary controls, and as virtual display elements, for example virtual signal lamps, value displays, or plotters. Accordingly, they have an output and/or input function for the data structure.

Sources of the data structures 18 and elements 12 of the MMI here are separate modeling and instrumentation programs, or separate hardware configuration and instrumentation programs.

The method that is shown in FIG. 1 starts in step S100. According to step S100, the MMI, with a plurality of elements 12, is provided. In step S110, a plurality of data structures 18 are selected from among a universe of available data structures 18 of the data processing system, which are displayed in a data structure display element 24 as shown in FIG. 2. For this purpose, at least one filter criterion for selecting the plurality of data structures 18 is determined by the user, and the selection of the plurality of data structures 18 from the universe of available data structures 18 takes place automatically in accordance with the at least one filter criterion. Examples of a filter criterion in the case of data structures 18 that are variables include alphanumeric strings relating to the name or to a description of the variables, a variable type (int8, int16, float32, bool, etc.), an update rate (sample time) of the variables, or a functional block to which the applicable data structure is assigned. For data structures 18 as interfaces, a filter criterion can be, for example, the name, the description, or a hierarchy of the interfaces within components. The hierarchy can concern a model or a hardware unit of an open or closed control loop in which the interfaces are present, for example. The selection of the data structures 18 from the universe of data structures 18 is carried out using all selected filter criteria, with the filter criteria being employed one after the other in the order of their selection.

In step S120, the previously selected data structures 18 are arranged in the list 20. The list 20 is implemented here as a linked list, for example, in which the list elements each point to the next list element.

In step S130, the data structures 18 in the list 20 are sorted. To this end, at least one sort criterion is selected, and the data structures 18 in the list 20 are sorted automatically in accordance with the at least one sort criterion. For data structures 18 that are variables, sort criteria in this exemplary embodiment are alphanumeric strings relating to the name or to a description of the variables, a variable type (int8, int16, float32, bool, etc.), an update rate (sample time) of the variables, or a functional block to which the applicable data structure is assigned. For interfaces as data structures 18, a sort criterion can be, for example, the name, the description, or a hierarchy of the interfaces within components. The hierarchy can concern a model or a hardware unit of an open or closed control loop in which the interfaces are present, for example. The sorting of data structures 18 in the list 20 is carried out using all selected sort criteria, wherein the sort criteria are employed one after the other in the order of their selection. Sort algorithms as such are known in the technology.

In step S140, a selection of an element 12 of the MMI is carried out by a user. To this end, a graphical selector 14 is moved to the element 12 to be selected by a finger motion on the touch-screen, for example by pressing on the element 12 to be selected or by dragging the graphical selector 14 to the element 12 to be selected. As this takes place, the output unit 16 is moved with the graphical selector 14. The first data structures 18 of the list 20, which is to say the data structure 18 on which the beginning of the list is set and subsequent data structures 18, are displayed in the output unit 16 and the output element 22.

The selection of the element 12 of the MMI is actively confirmed by the user through an action, in that confirmation is made using the touch-screen, for example by another press on the element 12 to be selected.

In step S150, automatic linking of the first data structure 18 from the list 20 with the selected element 12 of the MMI takes place.

In step S160, the list beginning is set to the data structure 18 that follows the previously linked data structure 18 in the list 20. Accordingly, the output is updated in the output unit 16 and the output element 22. As part of this process, the previously linked data structure 18 is removed from the list 20. Alternatively, only display of the removed data structure is suppressed.

If data structures 18 and elements 12 of the MMI are still available, the method is continued with step S140.

In step S170, the method is terminated when the end of the list 20 of data structures 18 is reached, or once each element 12 of the MMI is linked to a data structure 18.

If the method is carried out at the runtime of the model, then output of a content of the applicable data structure 18 in the linked element 12 of the MMI takes place in addition, after the linking of data structure 18 and element 12 of the MMI. The output takes place as a function of the element type, for example as display of a variable.

Figure 3:
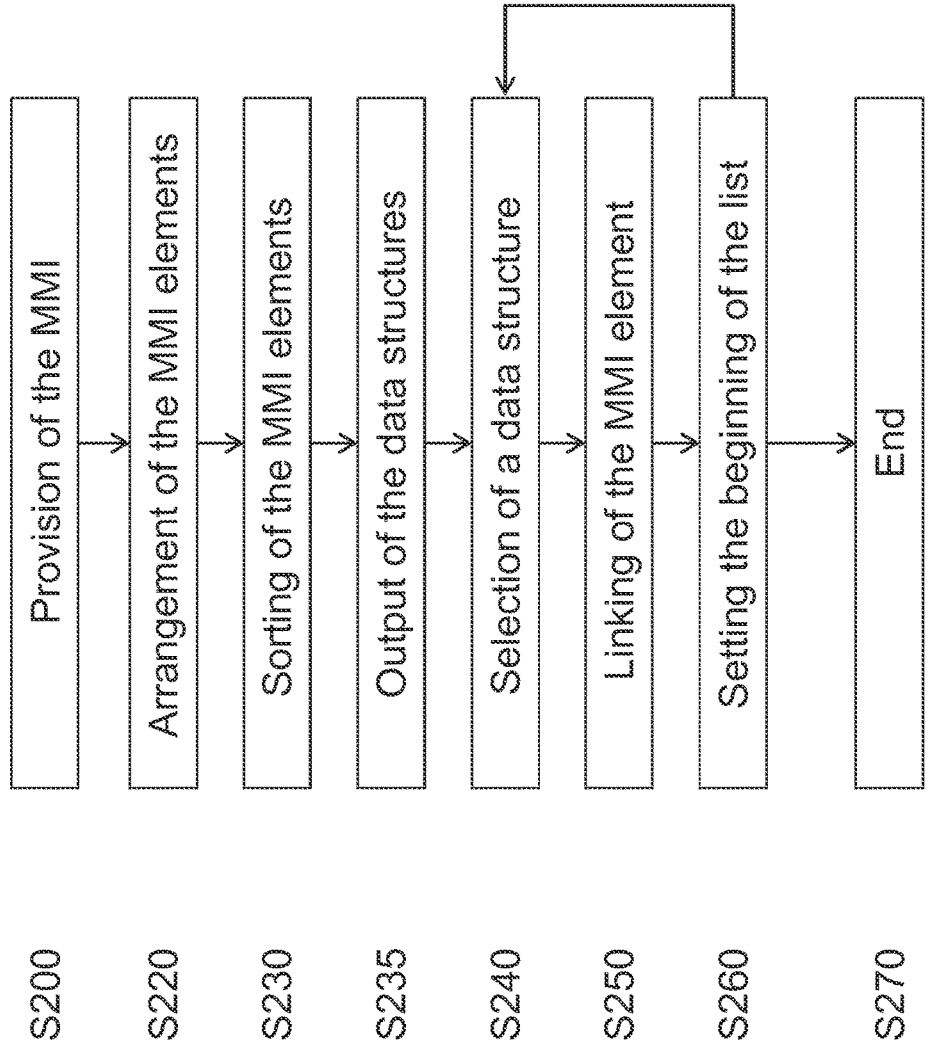
FIG. 3 is a flowchart of the performance of a method for linking a plurality of data structures of a data processing system with a plurality of elements of a man-machine interface (MMI) according to an embodiment.

With reference to FIG. 3, a second embodiment of a method for linking a plurality of data structures of a data processing system with a plurality of elements of a man-machine interface (MMI) is described. The aforesaid principles for the method of linking data structures and elements of the MMI regarding the first embodiment apply analogously to the method with the arrangement of the elements of the MMI in the list according to the second embodiment, so only differences will be discussed here.

The method starts in step S200.

In step S220, the elements 12 of the MMI are arranged in a list 20. The list 20 is implemented here as a linked list, for example, in which the list elements each point to the next list element.

In step S230, the elements 12 of the MMI in the list 20 are sorted. To this end, at least one sort criterion is selected, and the elements 12 of the MMI in the list 20 are sorted automatically in accordance with the at least one sort criterion. The sorting of the elements 12 of the MMI in the list 20 is carried out using all selected sort criteria, with the sort criteria being employed one after the other in the order of their selection.

In step S235, the universe of available data structures 18 of the data processing system is output in a data structure display element 24 in the browser window 10.

In step S240, a user makes a selection of a data structure 18 in the data structure display element 24. To this end, the graphical selector 14 is moved to the data structure 18 to be selected by a finger motion on the touch-screen, for example by pressing on the data structure 18 to be selected or by dragging the graphical selector 14 to the data structure 18 to be selected. As this takes place, the output unit 16 is moved with the graphical selector 14. The first elements 12 of the list 20, which is to say the element 12 of the MMI on which the beginning of the list is set and subsequent elements 12 of the MMI, are displayed in the output unit 16 and the output element 22.

The selection of the data structure 18 is actively confirmed by the user through an action, in that confirmation is made using the touch-screen, for example by another press on the data structure 18 to be selected.

In step S250, automatic linking of the first element 12 of the MMI from the list 20 with the selected data structure 18 takes place.

In step S260, the list beginning is set to the element 12 of the MMI that follows the previously linked element 12 of the MMI in the list 20. Accordingly, the output is updated in the output unit 16 and the output element 22. As part of this process, the previously linked element 12 of the MMI is removed from the list 20. Alternatively, only display of the removed element 12 of the MMI is suppressed.

If data structures 18 and elements 12 of the MMI are still available, the method is continued with step S240.

In step S270, the method is terminated when the end of the list 20 of elements 12 of the MMI is reached, or once each data structure 18 is linked to an element 12 of the MMI.

The method is implemented as a computer program product with computer-implemented instructions that executes the steps of the above method after loading and execution in the data processing device.

A digital storage medium provides control signals that are read out electronically and that interact with the data processing device in such a manner that the above method is executed on the data processing device.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for linking a plurality of data structures of a data processing system with a plurality of elements of a man-machine interface (MMI), the method comprising:
   providing an MMI with a plurality of elements;
   providing a list of the plurality of data structures in a predetermined order;
   selecting one of the elements of the MMI by a user;
   based on the selection of the one of the elements of the MMI, automatically selecting a first data structure from the list and linking the first data structure with the selected element of the MMI; and
   setting a beginning of the list to another data structure that follows a previously linked data structure in the list,
   wherein the steps of selection of one of the elements of the MMI by the user, based on the selection, automatically selecting a first data structure from the list and linking the first data structure with the selected element of the MMI, and setting the beginning of the list to another data structure that follows the previously linked data structure in the list are carried out repeatedly in the predetermined order,
   wherein the data structures represent components of a real or virtual open-loop control system, closed-loop control system, or mechatronic system, or connections to components of a real or virtual open-loop control system, closed-loop control system, or mechatronic system, and
   wherein the plurality of elements represent display features of the MMI.

2. The method according to claim 1, wherein the method further comprises terminating the method when an end of the list of the data structures is reached or as soon as a data structure is assigned to each element of the MMI.

3. The method according to claim 1, wherein the step of setting the beginning of the list to the data structure that follows the previously linked data structure in the list includes removal of the previously linked data structure from the list.

4. The method according to claim 1, wherein the MMI includes an output element for displaying at least one data structure, and wherein the method further comprises displaying in the output element, at least the data structure to which the list beginning is set.

5. The method according to claim 1, wherein the MMI has a graphical selector, in particular a pointer, that is movable between the elements of the MMI, and wherein selection of an element of the MMI by a user comprises moving the graphical selector to the element of the MMI to be selected and confirming the selection.

6. The method according to claim 5, wherein the MMI includes an output unit assigned to the graphical selector for displaying at least one data structure, wherein the output unit is movable with the graphical selector, and wherein the method further comprises displaying in an output unit at least the data structure to which the list beginning is set.

7. The method according to claim 1, wherein the step of arranging the plurality of data structures in a list includes sorting of data structures in the list.

8. The method according to claim 7, wherein the step of sorting of data structures in the list includes the determination of at least one sort criterion for sorting the data structures in the list and the automatic sorting of the data structures in the list according to the at least one sort criterion.

9. The method according to claim 1, wherein the method further comprises selecting the plurality of data structures of the data processing system from among at least one universe of available data structures of the data processing system.

10. The method according to claim 9, wherein the step of selecting the plurality of data structures of the data processing system from among a universe of available data structures includes a determination of at least one filter criterion for selecting the plurality of data structures and the automatic selection of the plurality of data structures from the universe of available data structures according to the at least one filter criterion.

11. The method according to claim 1, wherein the method includes the additional step of outputting a content of a data structure in the linked element of the MMI.

12. The method according to claim 1, wherein a data processing device performs the steps of arranging the plurality of data structures in the list; selecting an element of the MMI by the user; automatic linking of the first data structure from the list with the selected element of the MMI; and setting the beginning of the list to the data structure that follows the previously linked data structure in the list.

13. The method according to claim 12, wherein a digital storage medium with control signals that are read out electronically and interact with a programmable data processing device such that the method is executed on the data processing device.

14. The method according to claim 1, wherein the MMI has a touch-screen for displaying and selecting the elements of the MMI.

15. A method for linking a plurality of data structures of a data processing system with a plurality of elements of a man-machine interface (MMI), the method comprising:
   providing an MMI with a plurality of elements;
   providing a list of the plurality of elements in a predetermined order;
   providing a data structure display element in the MMI to represent at least a subset of the plurality of data structures;
   selecting one of the data structures in the data structure display element by a user;
   based on the selection of the one of the data structures, automatically selecting a first element from the list and linking the first element with the selected data structure; and
   setting a beginning of the list to another element of the MMI that follows a previously linked element in the list,
   wherein the steps of selecting one of the data structures in the data structure display element by the user, based on the selection, automatically selecting a first element from the list and linking the first element with the selected data structure, and setting a beginning of the list to another element of the MMI that follows a previously linked element in the list are carried out repeatedly in the predetermined order,
   wherein the data structures represent components of a real or virtual open-loop control system, closed-loop control system, or mechatronic system, or connections to components of a real or virtual open-loop control system, closed-loop control system, or mechatronic system, and
   wherein the plurality of elements represent display features of the MMI.

* * * * *